US006487360B1

(12) United States Patent
Sumiyoshi et al.

(10) Patent No.: US 6,487,360 B1
(45) Date of Patent: Nov. 26, 2002

(54) METHOD, APPARATUS, AND COMPUTER PROGRAM PRODUCT FOR EDITING MOVING IMAGE AND DISPLAYING SELECTED GROUPS OF REPRESENTATIVE IMAGES OF CUTS OF THE MOVING IMAGE SUCH THAT REPRESENTATIVE IMAGES HAVING A PREDETERMINED FEATURE CAN BE DISTINGUISHED FROM REPRESENTATIVE IMAGES NOT HAVING THE PREDETERMINED FEATURE

(75) Inventors: Masanori Sumiyoshi, Kodaira; Hirotada Ueda, Kokubunji, both of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/140,351

(22) Filed: Aug. 26, 1998

(30) Foreign Application Priority Data

Aug. 29, 1997 (JP) .............................................. 9-234706

(51) Int. Cl.[7] .............................. G11B 27/00; H04N 5/93
(52) U.S. Cl. .............................. 386/52; 386/64; 345/723
(58) Field of Search .................................. 386/4, 52–55, 386/64; 360/13; 369/83; 345/723, 726

(56) References Cited

U.S. PATENT DOCUMENTS

| 5,706,097 | A | * | 1/1998 | Schelling et al. ........... 358/296 |
|---|---|---|---|---|
| 5,724,579 | A | * | 3/1998 | Suzuki ....................... 707/104 |
| 5,956,453 | A | | 9/1999 | Yaegashi et al. |
| 5,974,219 | A | * | 10/1999 | Fujita et al. .................... 386/52 |
| 5,995,095 | A | * | 11/1999 | Ratakonda ................... 345/328 |
| 6,118,925 | A | * | 9/2000 | Murata et al. ................. 386/83 |
| 6,134,378 | A | * | 10/2000 | Abe et al. ..................... 386/52 |
| 6,134,380 | A | * | 10/2000 | Kushizaki .................... 385/55 |
| 6,192,183 | B1 | * | 2/2001 | Taniguchi et al. ............. 386/52 |
| 6,272,279 | B1 | * | 8/2001 | Yokoyama et al. ........... 386/52 |
| 6,278,497 | B1 | * | 8/2001 | Sumiyoshi et al. ........... 385/52 |

FOREIGN PATENT DOCUMENTS

| JP | 2-184181 | 7/1990 |
|---|---|---|
| JP | 6-223179 | 8/1994 |
| JP | 9-179880 | 7/1997 |

* cited by examiner

*Primary Examiner*—Andrew Faile
*Assistant Examiner*—Polin Chieu
(74) *Attorney, Agent, or Firm*—Antonelli, Terry, Stout & Kraus, LLP

(57) ABSTRACT

A method and an apparatus for editing a moving image display a plurality of representative images, each representing a specific frame image among a plurality of serial frame images constituting the moving image, by arranging the representative images on a screen of a display unit. The method and the apparatus for editing a moving image also detect a feature of video data of the moving image or of the representative images based on the video data. The representative images are then displayed on the screen in a manner different from a previous arrangement or display mode based on the detected feature.

21 Claims, 15 Drawing Sheets

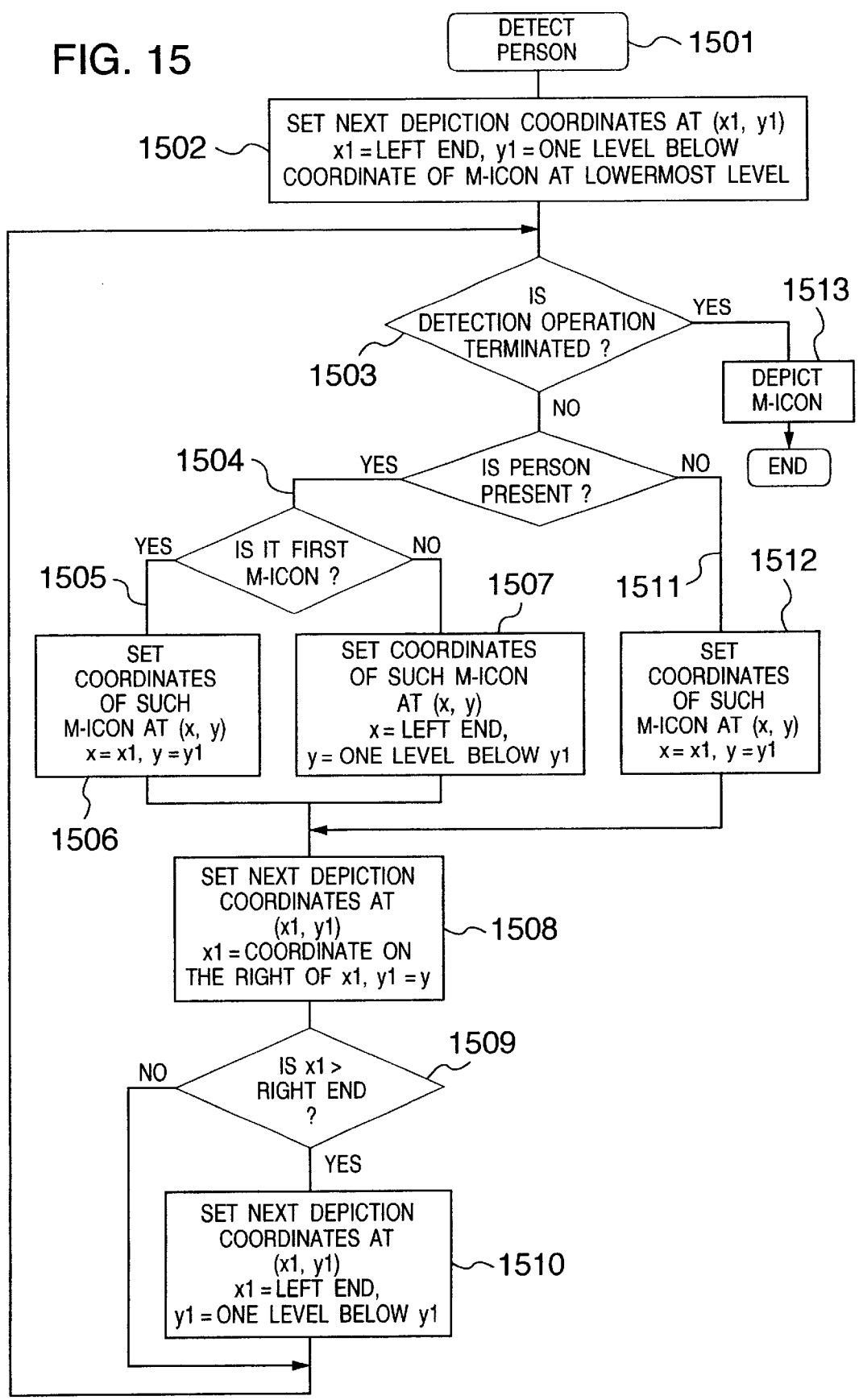

METHOD, APPARATUS, AND COMPUTER PROGRAM PRODUCT FOR EDITING MOVING IMAGE AND DISPLAYING SELECTED GROUPS OF REPRESENTATIVE IMAGES OF CUTS OF THE MOVING IMAGE SUCH THAT REPRESENTATIVE IMAGES HAVING A PREDETERMINED FEATURE CAN BE DISTINGUISHED FROM REPRESENTATIVE IMAGES NOT HAVING THE PREDETERMINED FEATURE

CROSS-REFERENCES TO RELATED APPLICATIONS

The present application relates to subject matter described in copending applications Ser. No. 08/826,974 filed on Apr. 9, 1997, now abandoned, and Ser. No. 08/826,975 filed on Apr. 9, 1997 now U.S. Pat. No. 5,956,453. The disclosures of these applications are incorporated herein by reference in their entirety.

BACKGROUND OF THE INVENTION

The present invention relates to a method and an apparatus for editing a moving image used for the production of moving images in television broadcasting programs, video programs, and the like.

Computer-aided sophisticated functions are rapidly developed for producing television broadcasting programs and video programs. Particularly, recently developed moving image editing apparatuses edit video information by storing it in an inexpensive, easy-to-handle, and easy-to-store, randomly-accessible storage unit such as a hard disk, instead of using video tape recorders in which video information is edited by repeating fast-forward and rewind operations again and again with the tape counter. The "video information" herein used means all video information including audio signals.

Image data that constitutes a moving image recorded in a magnetic storage device or the like can be defined as a collection of cuts and scenes. The "cut" can be defined as a set of frame images photographed between the start and end of a single photographing operation using a TV camera. The "scene" can be defined as a set of cuts in which a predetermined object is photographed. A plurality of scenes can be grouped into a specific photographic theme. Such moving image data can be organized in the form of a hierarchical structure including combinations of cuts and scenes. While a recording medium such as magnetic tape stores frame image data chronologically, a magnetic disk or an optical disk stores image data not necessarily chronologically, but in a different order, and these disk-type recording media are advantageous in that it takes almost the same time to access any video data contained therein.

A computer-aided moving image editing system provides various techniques that facilitate editing operation. For example, representative images representing the cuts and scenes that constitute a moving image to be edited are stored in a storage unit in the form of reduced still images. The representative images are displayed on a screen chronologically. Such a display facilitates an operator to check the reduced still images and select an image he wishes to edit. Such a display also allows the operator to manage the image data on a cut or a scene basis.

SUMMARY OF THE INVENTION

Each representative image is a still image reduced to, e.g., about 80×60 pixels by thinning the pixels of an NTSC frame image consisting of, e.g., 640×480 pixels. Such reduced still image is called an "M-icon." The M-icon according to the present invention can be prepared not only from NTSC frame images but also from other TV system moving image data. The number of pixels of an M-icon is not limited to 80×60, either.

The object of the present invention is to provide a method and an apparatus for editing a moving image and a recording medium for storing a procedure of the editing method, which method and apparatus allows an operator to detect a desired representative M-icon from a plurality of M-icons displayed on an editing screen quickly and easily and to specify the detected M-icon.

A first aspect of the present invention provides a method of editing a moving image comprising the steps of: displaying a plurality of representative images by arranging the representative images on a screen of a display device, each representative image representing a specific frame image which an operator requires for example, among a plurality of serial frame images constituting the moving image; detecting a feature of video data of the moving image or of the representative images based on the video data; and displaying the representative images on the screen in a manner different from the arrangement or display mode of the representative images defined in the first displaying step based on the detected feature.

A second aspect of the present invention provides an apparatus for editing a moving image comprising: an input unit for allowing an operator to enter an instruction; a storage unit for storing data of a plurality of serial frame images constituting the moving image and video data of a representative image representing a specific piece of frame image data; a display unit for displaying an edited result on a screen; and a control unit for receiving the instruction from the input device, executing a predetermined editing process and outputting the edited result to the display unit. The control unit includes: means for reading video data of a plurality of representative images from the storage unit and arranging the read video data on a screen of the display unit in a first display mode; means for detecting a feature of video data of the moving image or of the representative images based on the video data; and means for arranging the representative images on the screen of the display unit in a second display mode that is different from the first display mode based on the detected feature.

A third aspect of the present invention provides a recording medium that stores a procedure of the editing method of the invention in a computer readable code.

BRIEF DESCRIPTION OF THE DRAWINGS

FIG. 15 is a flowchart showing a procedure for modifying the arrangement of M-icons, which is an embodiment of the present invention.

DESCRIPTION OF THE PREFERRED EMBODIMENTS

Figure 3:
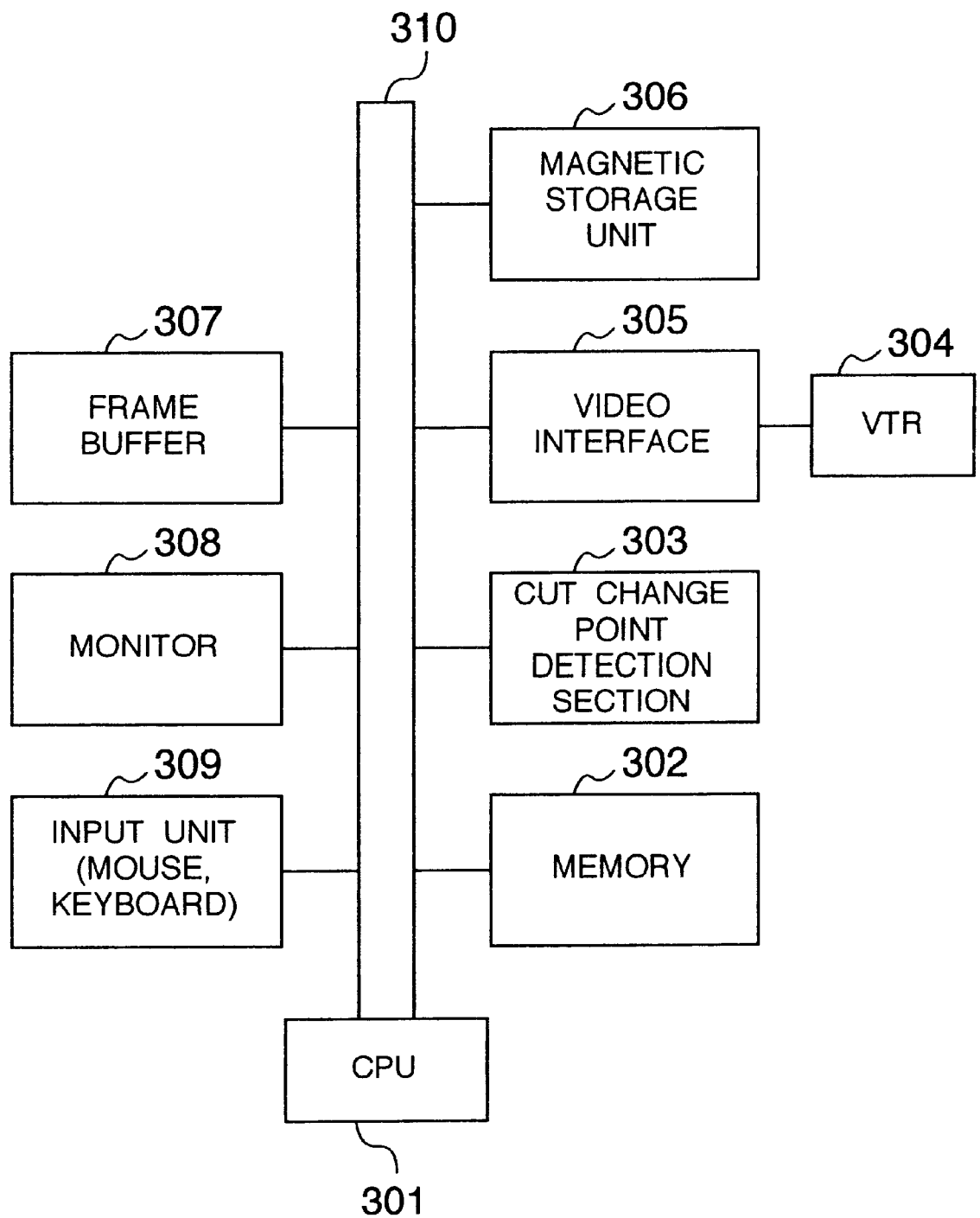
FIG. 3 is a block diagram showing an exemplary construction of the moving image editing apparatus referred to in FIG. 1.

FIG. 3 is a diagram showing an exemplary construction of a moving image editing apparatus, to which the present invention can be applied. The apparatus comprises a CPU 301, a storage device 302 such as random access memory, a cut change point detection section 303, a VTR 304, a video interface 305, a storage device 306 such as a magnetic storage unit, a frame buffer 307, a monitor 308, an input unit 309 and a bus 310. The bus 310 connects the memory 302, the cut change point detection section 303, the video interface 304, the magnetic storage unit 306, the frame buffer 307, the monitor 308 and the input unit 309 to the CPU 301. The VTR 304 is connected to the video interface 305.

In FIG. 3, the CPU 301 intercommunicates with the components connected thereto via the bus 310, and controls these components with its access signals. The CPU 301 receives an instruction from an operator through the input unit (a mouse or keyboard) 309. The VTR 304 reproduces a series of moving image consisting of a plurality of scenes, and sends the reproduced moving image to the video interface 305. The video interface 305 converts the received moving image into a format that can be handled by the moving image editing apparatus, and sends the converted image to the cut change point detection section 303, the memory 302 and the magnetic storage unit 306. The cut change point detection portion 303 detects the change point of cuts in the received moving image. The memory 302 stores various control programs for the CPU 301. The CPU 301 stores in the magnetic storage unit 306 the frame number of a detected cut change point, an M-icon (moving icon), the name of an M-icon file, a cut number, a sequence number and control information for controlling these data.

The image data constituting a moving image recorded in the magnetic storage unit 306 and the like can be defined as a set of scenes. The "cut" can be defined as a set of frame images photographed during a single round of photographing operation, i.e., from the start to the end of a single photographing operation, using a camera. The moving image editing apparatus adopts a GUI (graphical user interface) system in which an M-icon corresponds to each of frame images photographed in a single round of photographing operation on a one-to-one basis. The "M-icon" means a reduced image for rapidly displaying a frame image representing the whole moving image or one or more particular scene consisting of a plurality of frames, and an image so reduced as to match the size of a representative image of a cut. The "scene" means a set of cuts in which a specific object is photographed. A plurality of scenes can be grouped into a predetermined photographic theme (e.g., program). Thus, video materials can be grasped as video data of a hierarchical structure, such as a moving image that includes a hierarchical level for several cuts, a hierarchical level for several scenes each consisting of a plurality of cuts, a hierarchical level for a photographic theme (or title) into which a plurality of scenes are grouped. The frame number, the cut number and the sequence number are arranged in such a manner as to correspond to this hierarchical structure, and the control information includes these hierarchical structure information. The cut number is serially given to each cut consisting of a plurality of frames. The sequence number indicates the sequence of each of the cuts belonging to a scene.

The monitor 308 is a GUI screen that displays scenes, cuts, hierarchical structure (tree structure) information indicating editing conditions, and the like. The operator, using the input unit 309, gives instructions to the moving image editing apparatus through this monitor 308. The frame buffer 307 stores images to be displayed on the monitor 308.

Using this editing apparatus capable of storing and managing a moving image in such a hierarchical structure, the operator can edit a moving image on a scene and a cut basis.

A cut change point detection technique is disclosed, e.g., in JP-A-2-184181. This technique, involving an analysis of illuminance, volume, tone and the like between images, is designed to detect any abrupt change as a cut change point based on the analysis.

As to an operation of the editing apparatus and an editing method in which M-icons (display images) are used to prepare tree structures, techniques disclosed in, e.g., co-pending U.S. patent applications Ser. No. 08/826,975 filed on Apr. 9, 1997 and Ser. No. 08/826,974 filed on Apr. 9, 1997 can be utilized.

Figure 2:
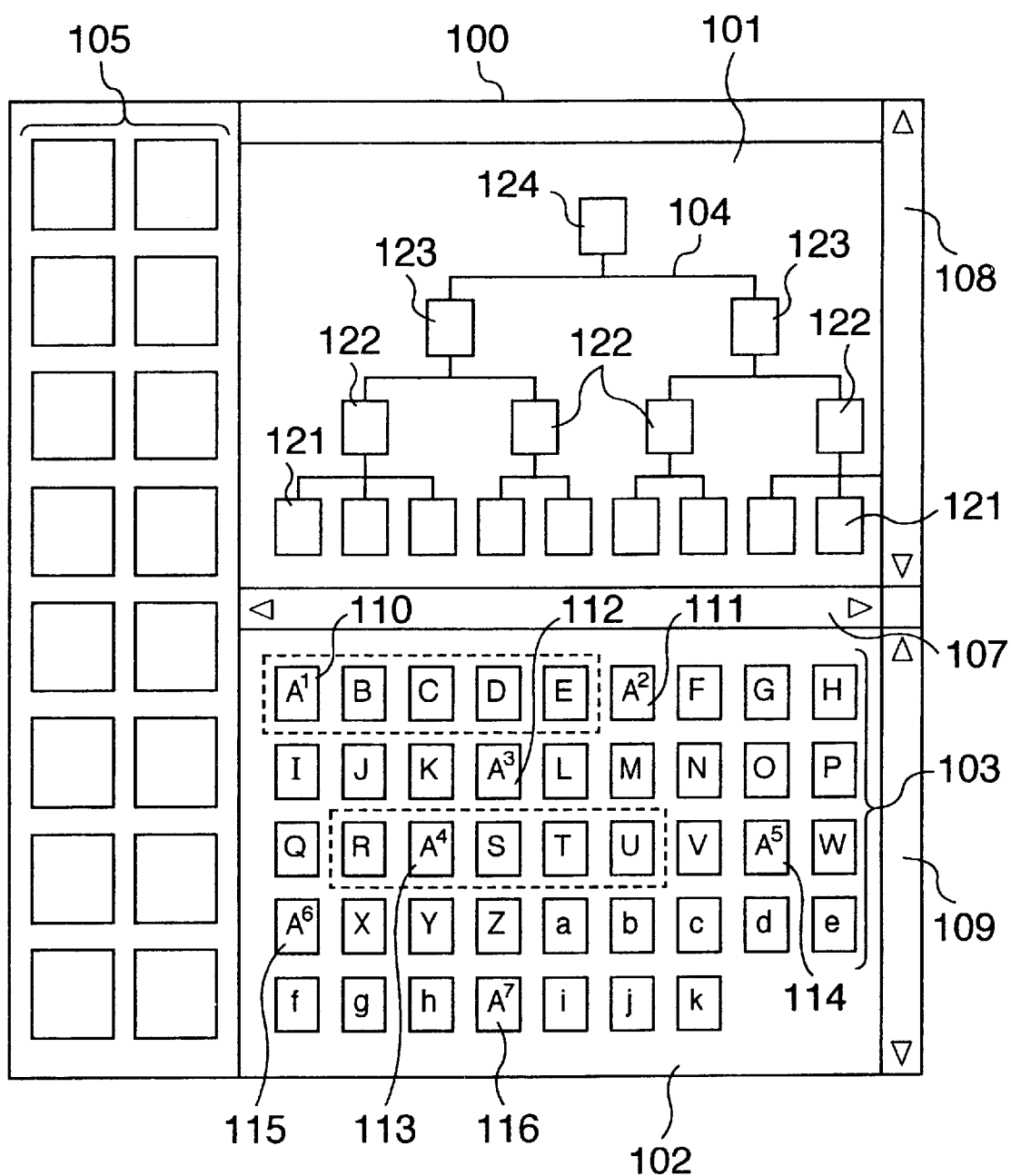
FIG. 2 is a diagram showing an exemplary display of an editing window of the moving image editing apparatus referred to in FIG. 1.

FIG. 2 shows an exemplary editing screen displayed on the monitor 308 in a case where a news program is taken as an editing material. This screen is useful when an operator intends to prepare subject-based news programs, e.g., news digests. The editing screen shown in FIG. 2 comprises an editing window 100, an editing area 101, a material area 102, M-icons 103, a tree structure 104 of M-icons for indicating how data is edited, editing function buttons 105, a slider 107 for horizontally sliding a display screen, sliders 108 and 109 for vertically sliding display screens within the editing area 101 and the material area 102, an M-icon 121 representing a cut being edited, an M-icon 122 representing a scene, an M-icon 123 representing a photographic theme or a specific set of scenes and an M-icon 124 indicating a program.

The tree 104 for M-icons in the editing area 101 has the following hierarchical structure. A plurality of M-icons 121 each representing a cut being edited are grouped under an M-icon 122 representing a scene that is on a higher level of the hierarchy: a plurality of M-icons 122 are grouped under an M-icon 123 representing a photographic theme or a specific set of scenes that is on a still higher level of the hierarchy; and a plurality of M-icons 123 are grouped under the M-icon 124 indicating a program. The number of hierarchical levels in the tree structure can, of course, be set as desired. FIG. 2 does not show the whole part of the tree structure 104 due to screen size restrictions imposed on the editing area 101. To display the not shown part of the tree structure, the sliders 107 and 108 are used to move the screen horizontally and vertically, respectively.

Since the tree structure 104 has already been prepared as described above in the editing area 101, let us continue the editing operation by selecting M-icons 103 including a desired video image from the material area 102.

The M-icons 103 listed in the material area 102 are so picked up from the cuts detected by the cut change point detection section 303. They are temporarily displayed in the form of a list in the material area 102 for editing. Upon calling an image, the M-icons 103 are arranged in the material area 102 from left to right and from top to bottom chronologically. To see other M-icons 103 that are not currently displayed in the material area 102, the slider 109 is used in a manner similar to seeing M-icons in the editing area 101. Then, the operator continues editing (e.g., preparing a single program) by selecting desired M-icons 103 from the list and moving or copying the selected M-icons up to the editing area 101.

It is less likely that all the materials (cuts) stored in the magnetic storage unit 306 (or all of a series of materials read to the editing apparatus as a single moving image file) are used as cuts necessary for preparing a program. That is, it is less likely that all the M-icons 103 are used, but materials that are represented by only such M-icons as serving the editing purpose are used for the program. Further, since the materials or file usually include a plurality of scenes, the operator has to search "a series of necessary M-icons" from a great number of M-icons included in the read materials or file.

Among the M-icons 103 in the material area 102, each of M-icons for example 110, 111, 112, 113, 114, 115 and 116 represents a cut in which an announcer appears. An original news program stored in the magnetic storage unit 306 is prepared in such a form that the appearance of an announcer precedes the news contents of each news item; i.e., upon appearance of a next announcer comes a next news item.

When the original news program is read from the magnetic storage unit 306, M-icons are arranged as displayed in the material area 102 of FIG. 2.

Figure 12:
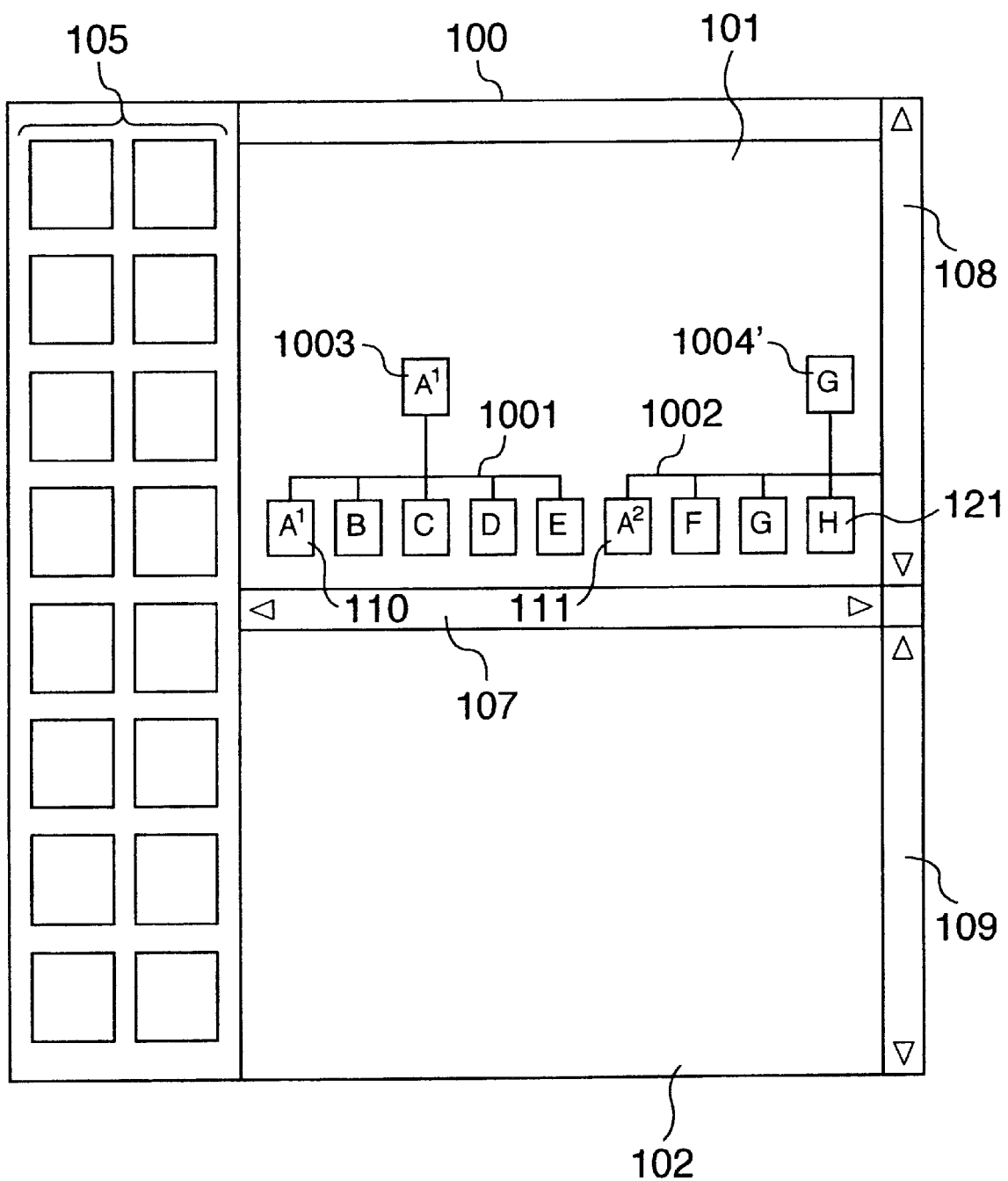
FIG. 12 is a diagram showing another exemplary display of the editing window of the moving image editing apparatus referred to in FIG. 1.

Cuts "$A^1$" to "k" are chronologically arranged. Among such cuts, the M-icons 110 to 116 denoted by "$A^n$" represent cuts in each of which an announcer appears, and the other M-icons indicate news contents. That is, a group of M-icons "B" to "E" interposed between the M-icon 110 denoted by "$A^1$" and the M-icon 111 denoted by "$A^2$" indicates one news item, and a next group of M-icons "F" to "K" interposed between the M-icon 111 denoted by "$A^2$" and the M-icon 112 denoted by "$A^3$" indicates another news item. When the operator selects the M-icons "$A^1$" to "E" and presses a bind cut button to edit the news item starting with the M-icon 110, a group of M-icons "$A^1$" to "E" is moved up to the editing area 101 to form a tree in the area 101, and an M-icon for displaying the starting frame data of the M-icon "$A^1$" that represents the group of M-icons "$A^1$" to "E" is automatically prepared on top of the tree. Of course, the operator can modify the frame data of such M-icon automatically prepared on top of the tree to any desired one as long as the frame data belongs to a group of cuts "$A^1$," "B," "C," "D" and "E" that constitutes the tree. If, on the other hand, the operator decided to eliminate all or part of the M-icons as he changed his mind, he can put these M-icons back to the material area 102, or move or copy them to form a different tree. Similarly, when the operator selects a group of M-icons "$A^2$" to "K" and presses the bind cut button, he can prepare a tree of the M-icons "$A^2$" to "K" in the editing area 101 (not shown in FIG. 2). An exemplary display of the modified tree structure in the editing area 101 is shown in FIG. 12. A tree 1001 displayed in the editing area 101 has, over the group of M-icons "$A^1$" to "E," an automatically prepared M-icon 1003 that displays the starting frame of the cut "$A^1$." Further, a tree 1002 has, over the group of M-icons "$A^2$" to "K," an automatically prepared M-icon 1004' that displays the starting frame of the cut "G." While the tree 1002 previously displayed the M-icon representing the starting frame of the cut "$A^2$" on top of the tree as the automatically prepared M-icon, the operator replaced such M-icon representing the cut "$A^2$" with the M-icon 1004' representing the starting frame of the cut "G." Although only a part of the tree 1002 is displayed in FIG. 12, the undisplayed part can be seen by changing the display range using the sliders 107 and 108. It may be noted that the M-icons 103 in the material area are omitted in FIG. 12.

As described above, to edit a news program, what the operator has to do is to look for the announcer-appearing M-icons 110 to 116 in the material area 102 and select the series of news items succeeding such M-icons. In actuality, however, the operator has difficulty finding an announcer in a small-sized M-icon image 103 quickly and correctly. That is, the operator's job of searching the material area 102 to locate the M-icons 110 to 116 in which announcers are photographed is extremely difficult.

Further, as described above, the editing of a moving image requires the operator to pick up one news item from the material area 102 in the form of a group of serial cuts. However, in the material area 102, all the M-icons are arranged merely at an equal interval, not classified according to the news item upon calling an image. That is, since the M-icons in the material area are displayed only at an equal interval on the monitor 308 independently of the classification of news items and since the display screen is small and there are a great number of M-icon images to be checked, the operation of reliably finding a desired news item (a group of serial cuts) has been time-consuming and has sometimes caused the operator to miss it.

An editing method, which is an embodiment of the present invention, eliminates these shortcomings and implements high-speed, reliable moving image editing with its feature of displaying M-icons in special modes that help the operator find necessary M-icons with ease.

According to the embodiment of the present invention, the operator can modify the initial display of equidistantly arranged M-icons. That is, an image stored in the magnetic storage unit 306 is so processed that a frame can be detected based on a preset feature, and the detected frame is used to rearrange M-icons in such a manner that a cut (M-icon) including the detected frame demarcates groups of serial M-icons.

As already referred to, FIG. 3 shows the construction of the moving image editing apparatus. The magnetic storage unit 306 may be substituted for by other type of storage medium, such as an MO disk storage unit or a remote file that is used through a network.

Figure 11:
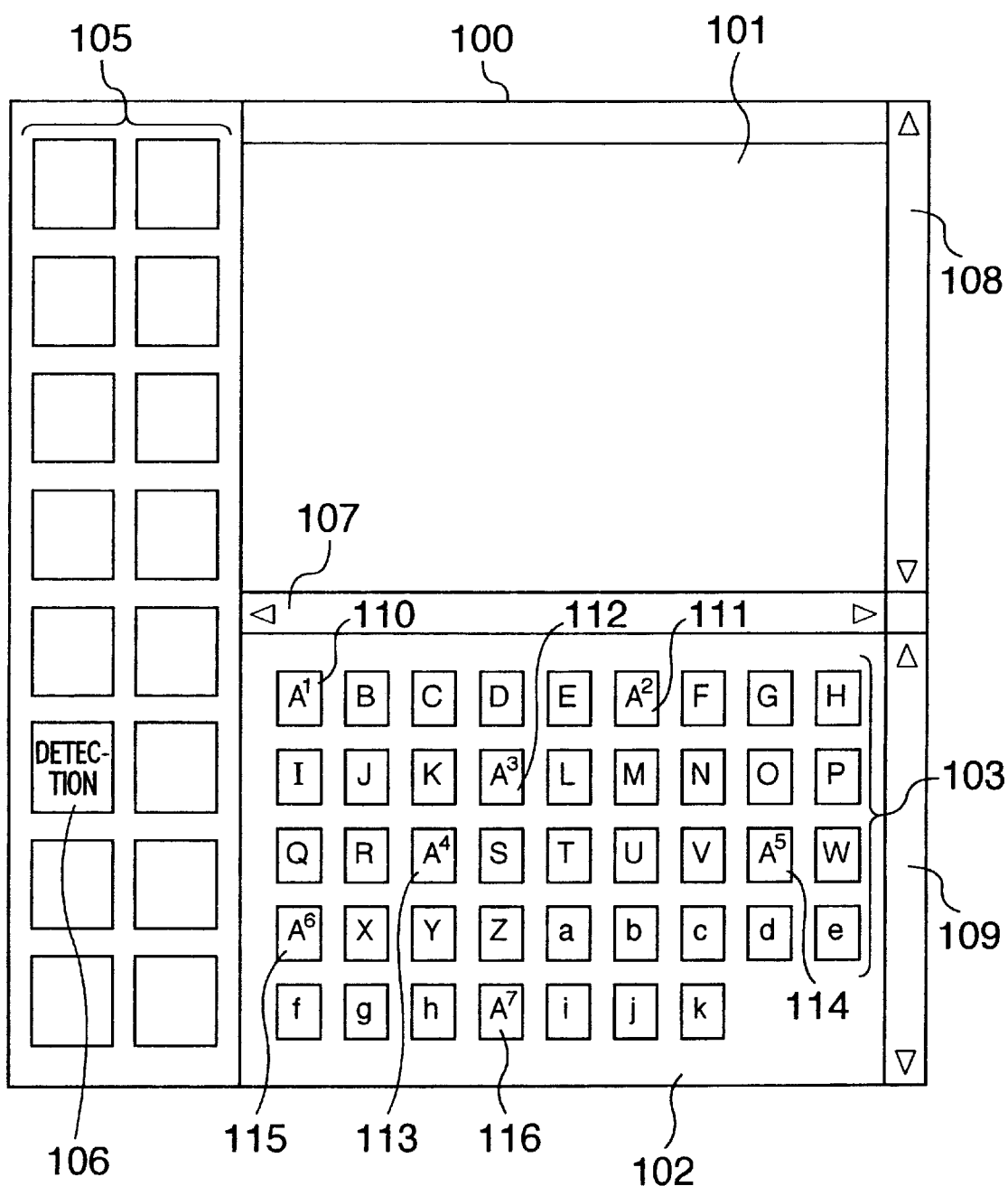
FIG. 11 is a diagram showing an exemplary display of an editing window of the moving image editing apparatus referred to in FIG. 1.

FIG. 11 is a diagram showing an exemplary editing screen of the moving image editing apparatus which is displayed on the monitor 308. In FIG. 11, a detection function button 106 is added to the editing function buttons 105 of FIG. 2, and a tree structure is not yet prepared in the editing area 101.

The editing method of the present invention will be further described in accordance with an editing procedure. The following description starts with the condition that editing materials are stored in the magnetic storage unit 306 in advance and that a series of moving image recorded on a cut change point basis is divided into a plurality of M-icons (e.g., "A" to "E").

First, the operator instructs the apparatus to read an image stored in the magnetic storage unit 306 through the input unit (a mouse or keyboard) 309. Then, the CPU 301 reads only the first frame of each of the cuts of the corresponding moving image, the first frame being a cut change point, and displays the read frames as the M-icons 103 in the material area 102 of the editing window 100 on the monitor 308 such as a CRT display unit as shown in FIG. 11. The editing window 100 is a GUI screen and comprises the material area 102 for displaying M-icons 103 to be used for editing, the editing area 101 for preparing a tree structure 104 by actually moving or copying M-icons, the buttons 105 for combining, dividing or trimming cuts, and giving various special effects to cuts, and the sliders 107, 108 and 109 for sliding display screens.

When an image is read, the M-icons 103 are usually displayed sequentially from left to right and from top to bottom in the material area 102. The operator performs the editing operation by selecting desired M-icons 103 and preparing a tree structure 104 in accordance with his editing purpose.

While the M-icons are arranged generally in the order of old images (or chronologically) as shown in FIG. 11, the order of arrangement may be set in any desired way; e.g., the M-icons can be arranged in the order of new images.

Let us now describe below an exemplary editing method in which an operator, taking a news program as an editing material, prepares subject-based news programs, e.g., news digests.

An original news program stored in the magnetic storage unit 306 is prepared in such a form that the appearance of an announcer precedes the news contents for each news item; i.e., upon appearance of a next announcer comes a next news item.

When the original news program is read from the magnetic storage unit 306, M-icons, which correspond to the cuts detected by the cut change point detection section 303, are arranged at an equal interval as displayed in the material area 102 of FIG. 11.

That is, cuts "A$^1$" to "k" are chronologically arranged. Among such cuts, the M-icons 110 to 116 denoted by "A$'''$" represent cuts in each of which an announcer appears, and the other M-icons indicate news contents. All the M-icons are arranged equidistantly. That is, a group of M-icons "B" to "E" interposed between the M-icon 110 denoted by "A$^1$" and the M-icon 111 denoted by "A$^2$" indicates one news item, and a next group of M-icons "F" to "K" interposed between the M-icon 111 denoted by "A$^2$" and the M-icon 112 denoted by "A$^3$" indicates another news item. However, it is difficult to distinguish one news item from another on this screen.

Figure 4:
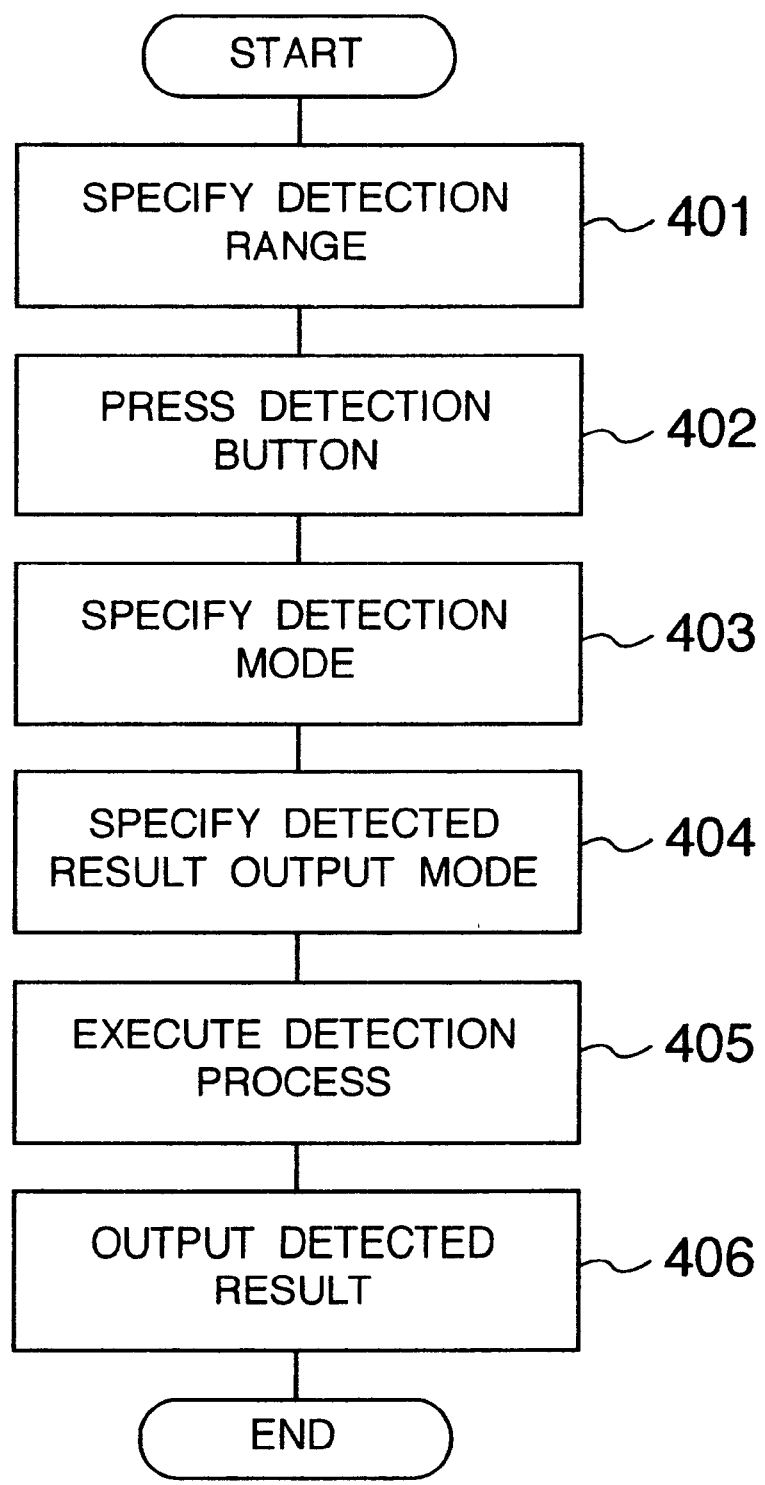
FIG. 4 is a flowchart showing an exemplary feature detection setting procedure used in the moving image editing apparatus referred to in FIG. 1.

FIG. 4 is an exemplary flowchart for illustrating a feature detection procedure involved in the moving image editing method, which is the embodiment of the present invention.

As described above, the operator selects a range of M-icons 103 for detecting a feature (detecting an announcer) from the material area 102 of the editing window 100 on the monitor 308 (Step 401). Then, the operator presses the detection button 106 of FIG. 11 through the input unit 309 to display a setting window shown in FIG. 5 on the monitor 308 (Step 402). Successively, the operator specifies a detection mode through the setting window of FIG. 5 (Step 403), specifies a detected result output mode and presses a start button (Step 404). As a result, the CPU 301 executes a detection process (Step 406) and outputs the detected result in the specified mode (Step 406).

Figure 5:
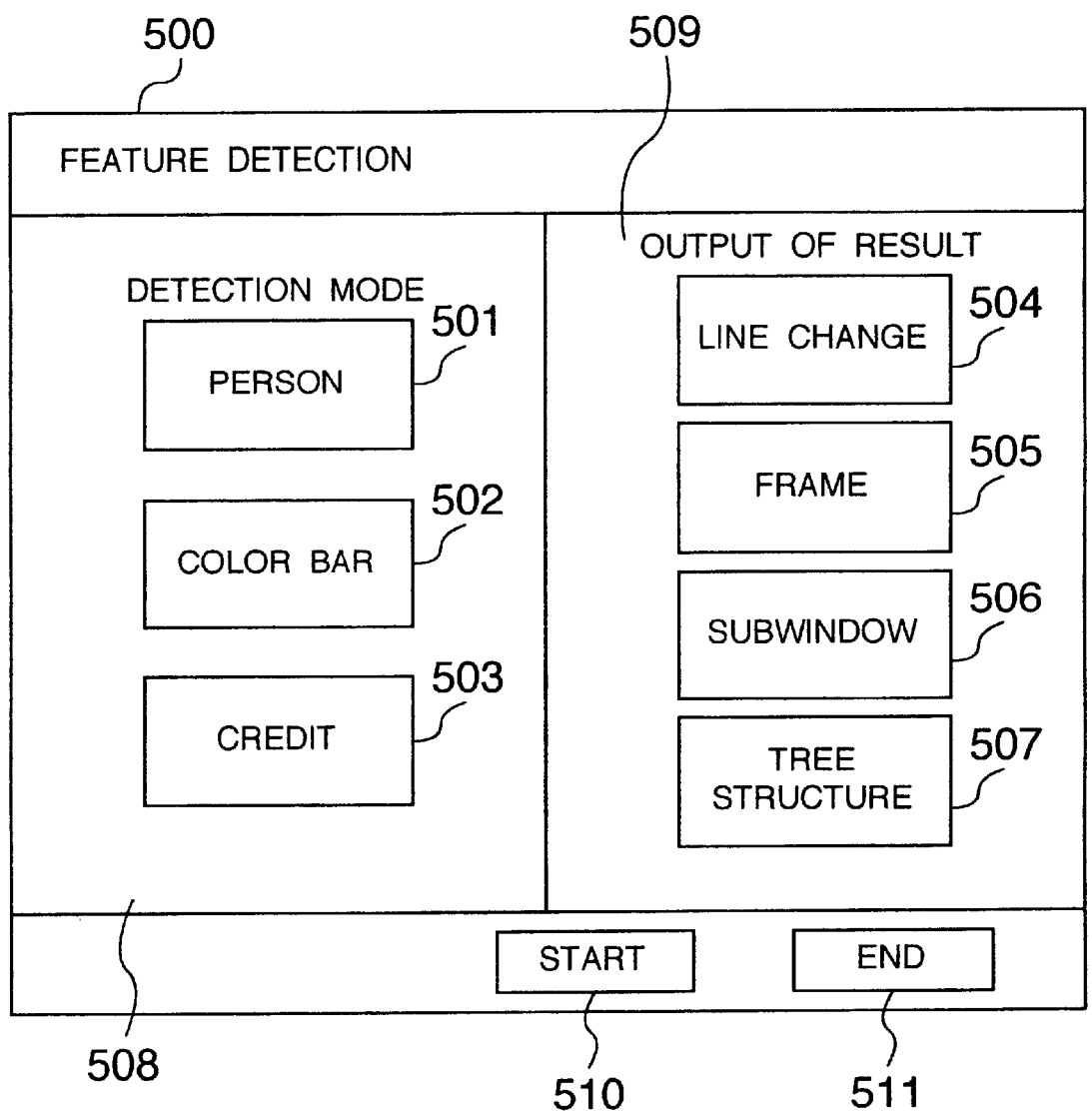
FIG. 5 is a diagram showing an exemplary display of a setting window of the moving image editing apparatus referred to in FIG. 1.

FIG. 5 is a diagram illustrating an exemplary setting window used for the feature detection of the present invention. A setting window 500 comprises a detection mode setting menu 508, a "person" button 501, a "color bar" button 502, a "credit" button 503, a detected result output mode setting menu 509, a "line feed" button 504, a "surround" button 505, a "subwindow" button 506, a "tree structure" button 507, a detection start button 510 and an end button 511 for closing a setting window. The operator presses the detection function button 106 after specifying a necessary range of M-icons 103 in the material area 102 of the editing window 100 shown in FIG. 11. Then, the setting window 500 shown in FIG. 5 appears on the monitor 308, allowing the operator to perform feature detection setting operation.

An exemplary feature detection setting operation to be performed when the operator decided to detect M-icons based on a person (announcer) and to display the detected result in the line feed mode will now be described.

Figure 1:
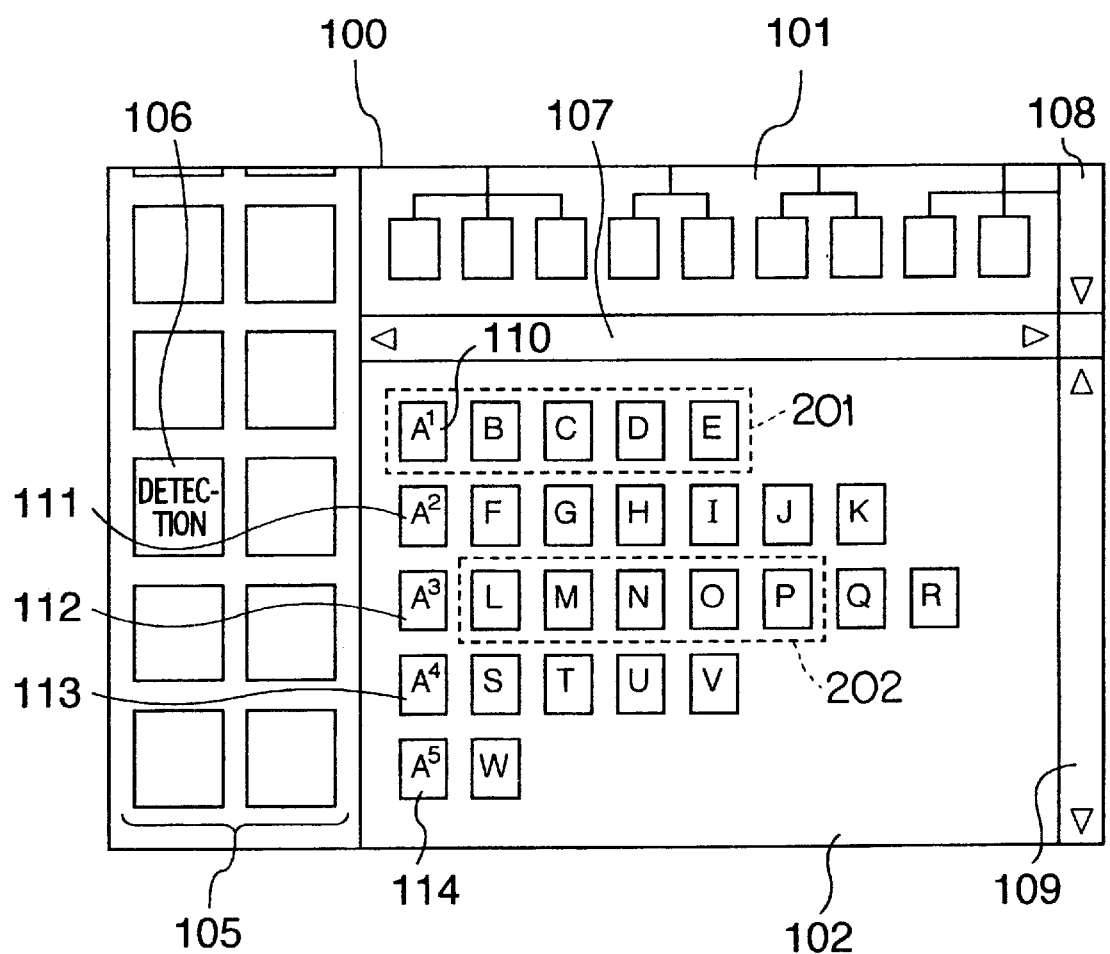
FIG. 1 is a diagram showing an exemplary display of a material area of a moving image editing apparatus to which the present invention can be applied.

In FIG. 5, the operator selects the "person" button 501 from the detection mode setting menu 508, and selects the "line feed" button 504 from the detected result output mode setting menu 509. When the operator presses the start button 510 thereafter, the CPU 301 reads M-icons from the magnetic storage unit 306 to detect an announcer through a person-based detection algorithm proposed, e.g., in JP-A-6-223179 or JP-A-9-179880. During the detection operation, the frame number of each M-icon in which an announcer is detected is recorded in the memory 302. The detection operation is repeated for all the selected M-icons in this way. Let us now take a case where the operator selects and detects all the M-icons "A$^1$" to "k" displayed in the material area 102 of FIG. 11. In this case, announcers are found in seven M-icons 110 to 116 respectively denoted by "A$^1$," "A$^2$," . . . "A$^7$" among the M-icons 103, and this information is stored in the memory 302. Then, the CPU 301 arranges the selected M-icons 103. in the chronological order based on the detected result, and feeds lines to display the announcer-appearing M-icons 110 to 116. During the operation, the CPU 301 keeps information about existence of M-icons in which persons are found and stores such information in both the memory 302 and the magnetic storage unit 306. This information can be used to display those person-showing M-icons in the line feed display mode in the editing area 102 when the operator reads a file including these M-icons once subjected to the person-based detection process from the moving image editing apparatus. FIG. 1 shows part of the thus rearranged M-icons.

FIG. 1 is a diagram illustrating how cuts in the material area 102 are rearranged based on the detected result and detected result output mode. The five lines are headed by the announcer-appearing M-icons 110 to 114 and followed by the M-icons indicating the contents of news items, respectively, with each line being fed at the end of the news item-indicating M-icon. As a result, it is clear that each line of the rearranged M-icons indicates one news item (provided however, a plurality of lines may be used to indicate one news item if a line is too short to accommodate all the cuts indicating the same news item).

Checking this display shown in FIG. 1, the operator can select M-icons necessary for his editing purpose (e.g., a group 201 of M-icons "$A^1$" to "E" and a group 202 of M-icons "L" to "P") with ease. While the M-icons 115 and 116 respectively denoted by "$A^6$" and "$A^7$" are not displayed due to screen size restrictions (imposed on the material area 102), the operator can see them by moving the screen up and down using the slider 109. It may be noted that the upper part of the editing window 100 is omitted in FIG. 1.

Then, an exemplary M-icon rearrangement process that is performed after the person-based detection will be described with reference to the flowchart shown in FIG. 15. In the embodiment of the present invention, after the setting of a detection mode and a result output mode shown in FIG. 5, the end button 510 is depressed without depressing the detection start button 510. After that, the detecting operation is taken. A plurality of groups of M-icons, each group being headed by a person-appearing M-icon, are displayed by feeding lines in the material area 102 after the detection operation. When the operator depresses the detection function button 106 after the operator set a detection mode and a result output mode beforehand, the CPU 301 performs the person-based detection operation in accordance with a predetermined procedure (Step 1501).

During the process, the lowermost coordinates (with the x-axis extending in the horizontal direction and the y-axis in the vertical direction from the origin located at the upper left corner) of the M-icons displayed in the material area 102 are obtained, and the position for depicting a next M-icon is set at the left end coordinate on the x-axis and a coordinate one level lower than the lowermost coordinate on the y-axis (Step 1502). Depiction coordinates are allocated to all the M-icons subjected to a detection process (Step 1503).

Specifically, when a person is found in an M-icon during the detection process (Step 1504), and if such M-icon is the first one of the M-icons (Step 1505), then such first M-icon is set to be located at the coordinates calculated by the process indicated in Step 1502 (Step 1506). To display each person-appearing M-icon at the beginning of a line for the rest of the M-icons, the x-coordinate of such person-appearing M-icon is set to the left end and the y-coordinate thereof to a value one level below the next depiction coordinate (Step 1507). Then, the next depiction coordinate on the x-axis is shifted one value rightward and the next depiction coordinate on the y-axis is set to the same value as that of the non-first, person-appearing M-icon (Step 1508). If the thus shifted next depiction coordinate on the x-axis takes a value greater than a predetermined rightmost depiction coordinate defined for a line of M-icons to be depicted in the material area 102 (Step 1509), the next depiction coordinate on the y-axis is set to a value one level below (since a line feed is required) (Step 1510).

Then, a case where no person is found in an M-icon during the detection process (Step 1511) will be described. In this case, each M-icon in which no person is found is displayed on the right of the preceding M-icon. Therefore, such M-icon is set to be located at the next depiction coordinates (Step 1512).

When the detection process is terminated with respect to a series of M-icons in this way, the M-icons are depicted in accordance with their set depiction coordinates.

Then, detection and display modes that are different from the above will be described.

To detect predetermined M-icons, color bar- and credit-based detection modes are available in addition to the person-based detection mode. To use these modes, the operator presses the "color bar" button 502 or the "credit" button 503 shown in FIG. 5. These modes are designed to detect a credit (character information) or a color bar signal that are put at the beginning of a video signal during, e.g., photographing to identify the content of a video image. An identifying signal other than a credit or a color bar signal may be prefixed to a predetermined M-icon signal.

Figure 6:
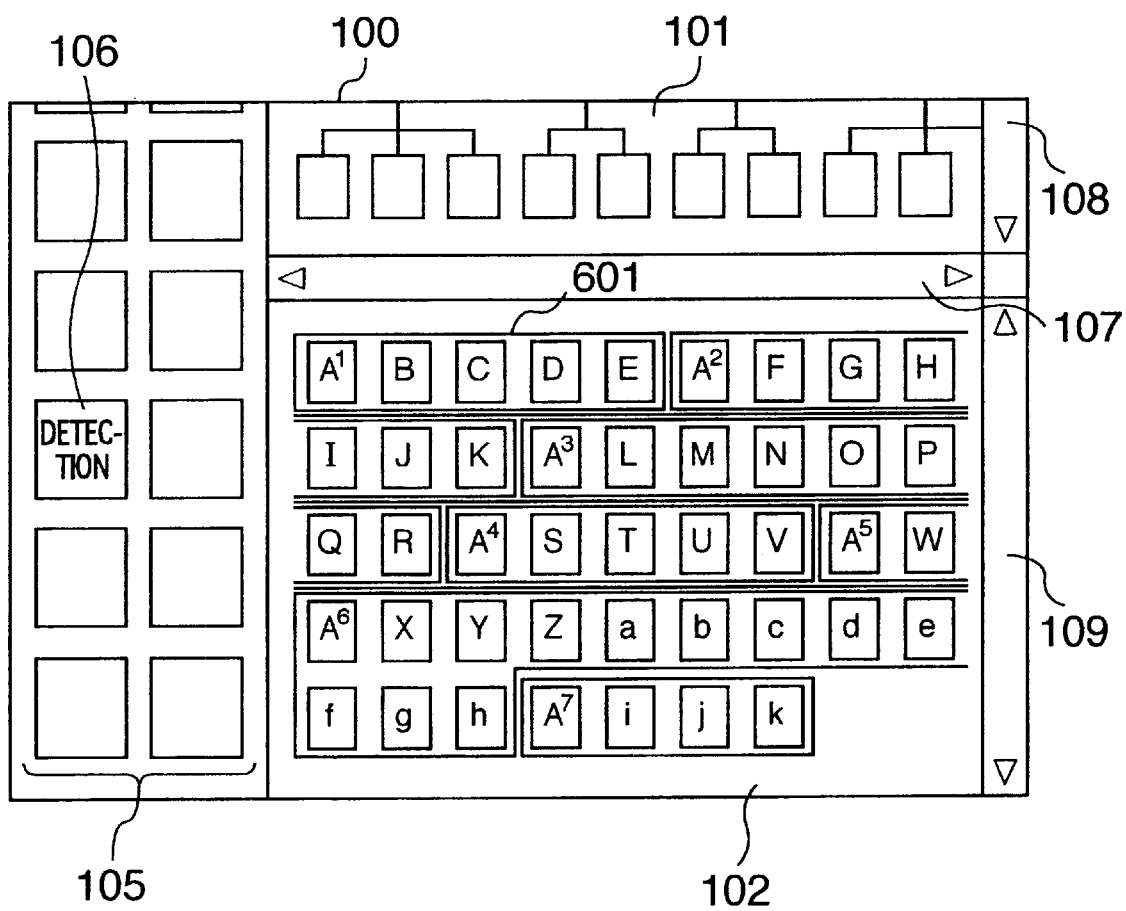
FIG. 6 is a diagram showing another exemplary display of the material area of the moving image editing apparatus referred to in FIG. 1.

Detected result display modes other than the line feed-based display mode are also available. One display mode allows the operator to surround with a frame a group of M-icons that are detected as indicating one news item when the operator presses the "surround" button 505. As shown in FIG. 6, a group of M-icons "$A^1$," "B" . . . "E" that are detected as including an announcer can be displayed while surrounded with a rectangular frame 601 (the color and pattern of the frame may be modified for a clearer display).

We will explain one example of procedure for displaying the frame surrounding a detected M-icon. After the detecting operation, the coordinates of the left-upper corner of the frame are calculated on the basis of the coordinates of the first M-icon among the M-icon group concerning a selected one news item, and then the coordinates of the right-lower corner of the frame are calculated on the basis of the coordinates of the last M-icon of the group. After that, the frame is drawn around the M-icon group according to the calculated coordinates. If the number of the M-icons of the group within a frame are too many to show on one line or row, the M-icons of the group are displayed in two or more lines and the brake between the end of line and the start of next line is not surrounded by the frame.

Figure 7:
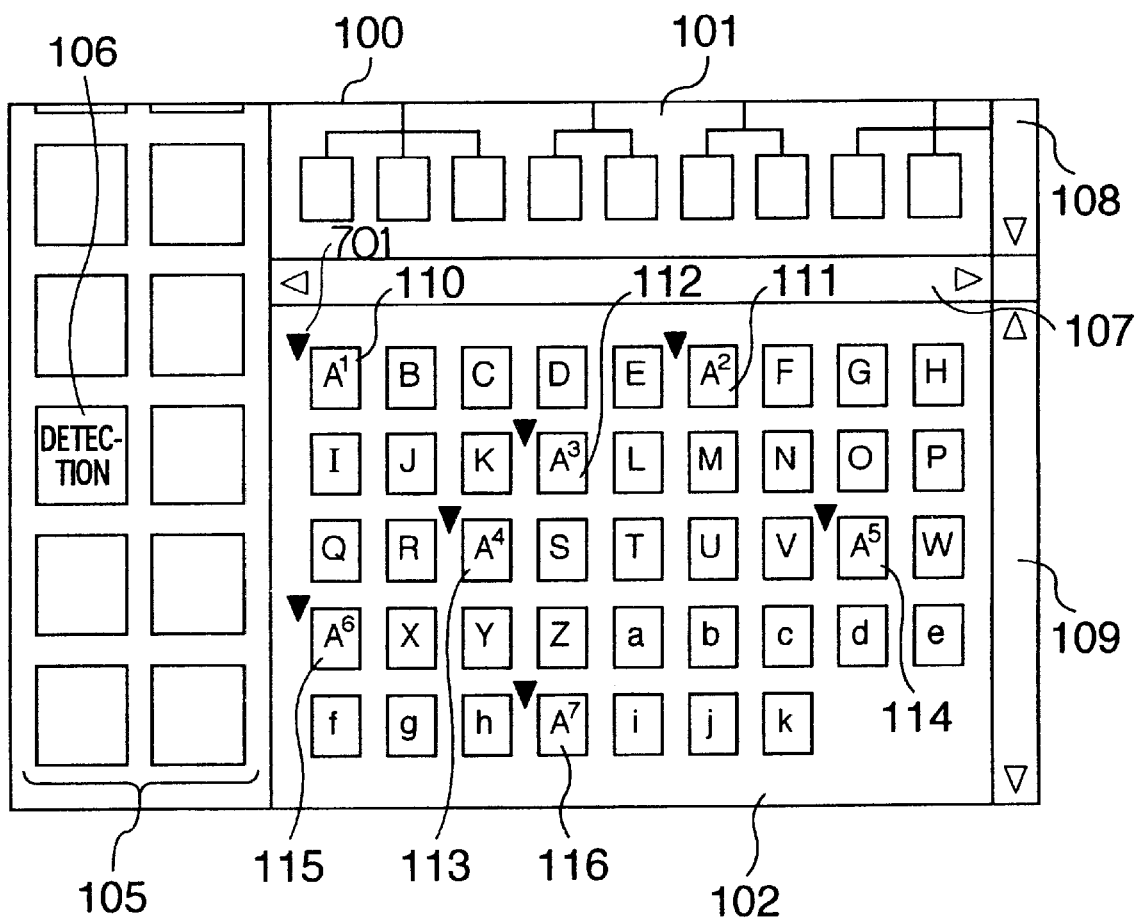
FIG. 7 is a diagram showing still another exemplary display of the material area of the moving image editing apparatus referred to in FIG. 1.

Another display mode uses a symbol 701 such as "▼" as shown in FIG. 7. When using this mode, the operator first presses the "surround" button 505 of FIG. 5 to display a not shown "surround type" selection window in front of the setting window 500, and then specifies, e.g., a "symbol" button in the displayed "surround type" selection window. As a result, a screen in which every group of M-icons is marked with the symbol such as shown in FIG. 7 appears, the "surround type" selection window is closed, and the indication of the button 505, which is "surround," is automatically changed to "symbol" in the detected result output mode setting menu 509. It goes without saying that the symbol 701 includes any shape other than "▼", any color, pattern, and decoration such as painting and hatching, and a combination thereof. It may be noted that the upper part of the editing window 100 is omitted in each of FIGS. 6 and 7. The above detected result display mode such as the rectangular frame, the symbol and the surround, etc. is called "feature indication".

Figure 8:
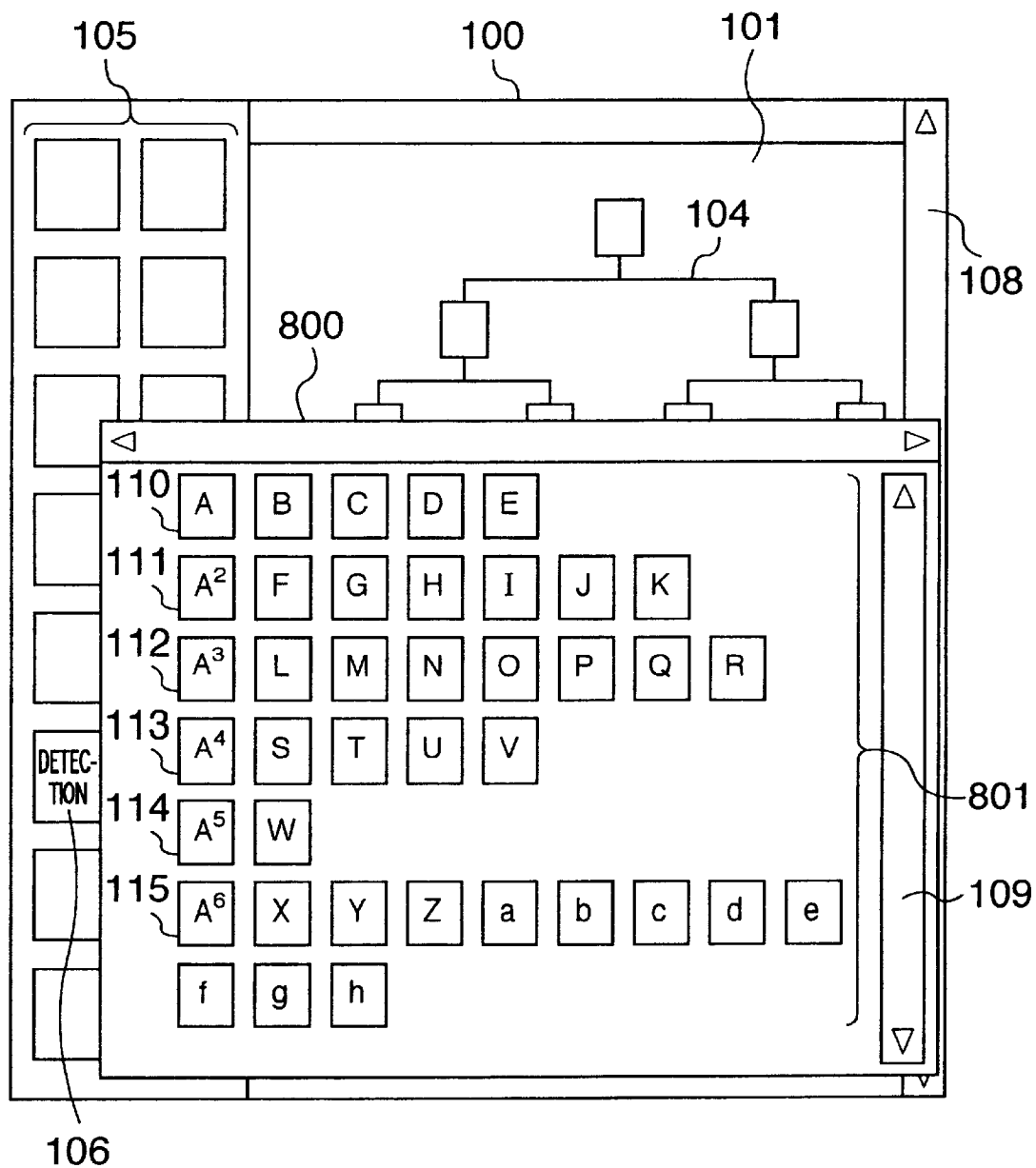
FIG. 8 is a diagram showing an exemplary display of a different display window of the moving image editing apparatus referred to in FIG. 1.
Figure 9:
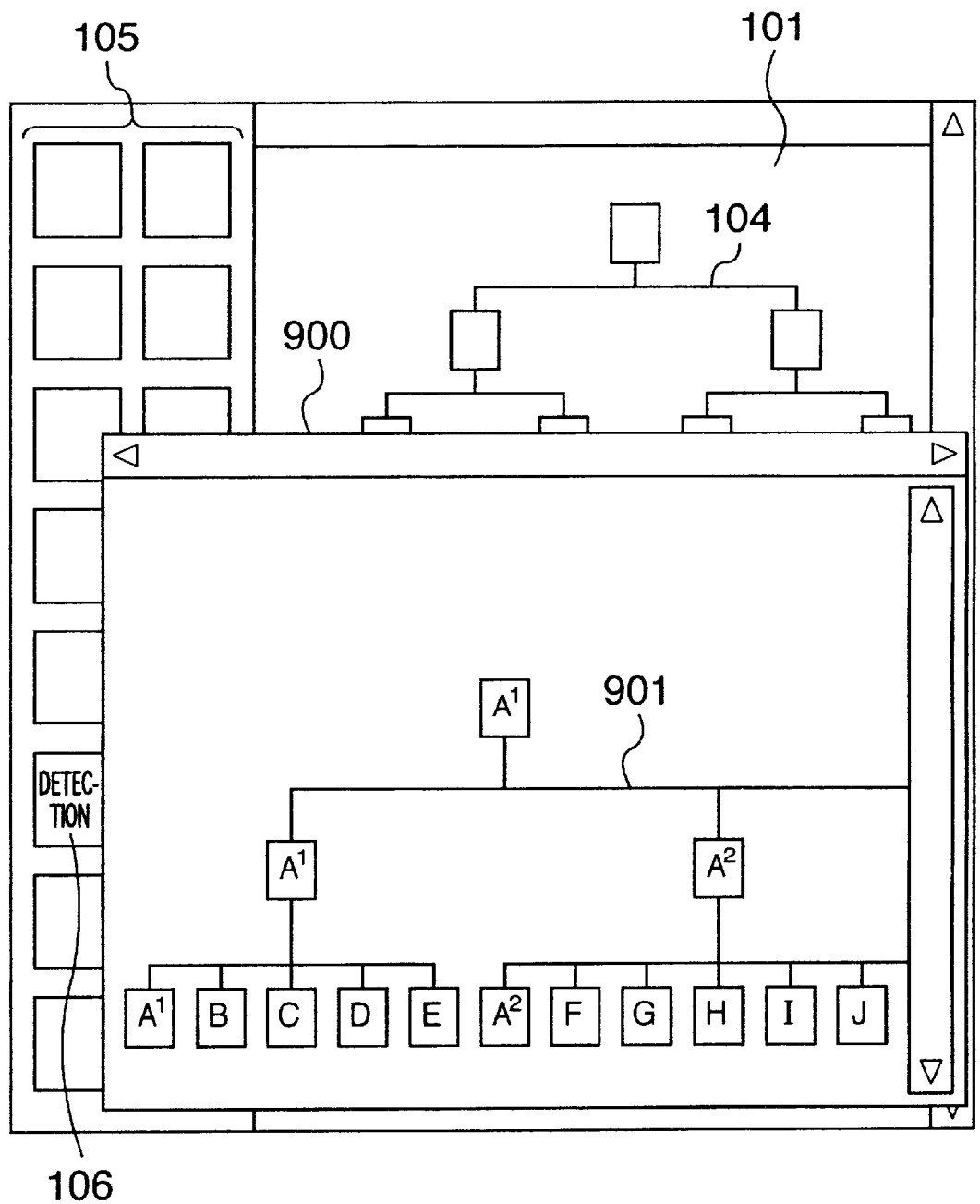
FIG. 9 is a diagram showing another exemplary display of the different display window of the moving image editing apparatus referred to in FIG. 1.

Still another display mode will be described. This is to display the detected result in a subwindow, which is different from the material area 102, on a multiwindow screen. To use this mode, the operator presses the "subwindow" button 506. Exemplary detected result displays provided by this mode are shown in FIGS. 8 and 9. In this mode, the detected result is not displayed in the material area 102, but in a subwindow 800 or 900 prepared in front of the editing window 100. Thus, free from screen size restrictions imposed on the material area 102, this display version enables a greater number of M-icons to be displayed at once, which hence improves editing efficiency. In addition, the subwindow-based display mode can be applied to a line feed arrangement 801, in which lines are fed every time an announcer-showing M-icon is detected, and to a tree-structure arrangement 901 or in the subwindow 900 as shown in FIG. 9. The subwindow 800 or 900 is size-adjustable and placeable at anywhere on the monitor 308.

While the tree structure 104 in the editing area 101 is different from the tree structure 901 in the subwindow 900 in FIG. 9, the tree structure 901 in the subwindow 900 can be added to the editing area 101 when the operator decided to use the tree structure 901 for his editing work and presses a not shown execution button in the subwindow 900. The operator can edit M-icons in the subwindow 900 similarly by moving and copying the M-icons to and from the material area 102 for addition and deletion.

There is still another display mode, which is a direct display of detected result in the form of a tree structure. This mode allows the operator to display the feature detection setting window 500 and press the "tree structure" button 507 directly, dispensing with the selection of M-icons 103 in the material area 102. Using this mode, the operator can skip the tree structure preparation process. The tree structure prepared by this mode can be displayed directly in the editing area 101 of the editing window 100 of FIG. 1.

Figure 13:
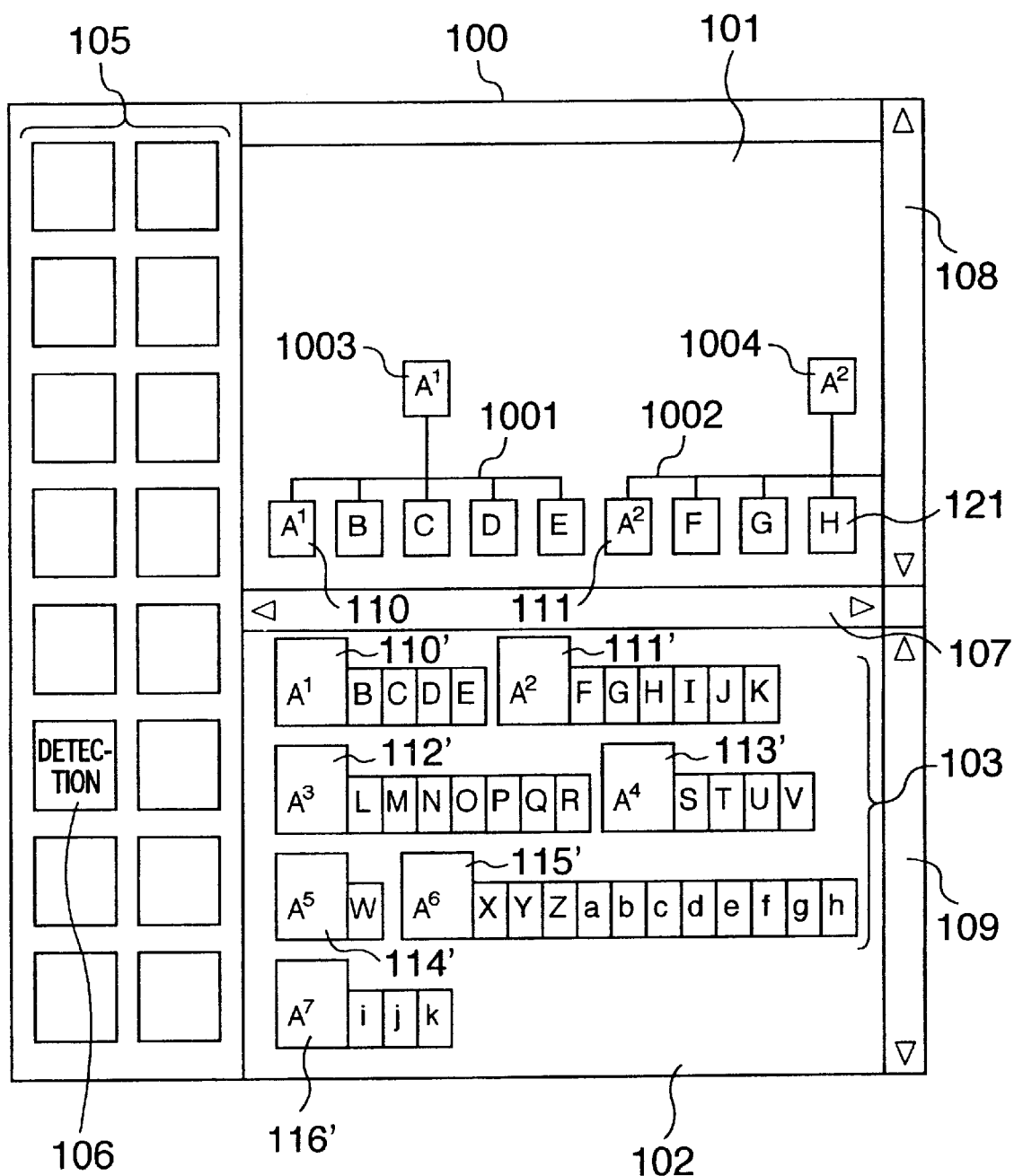
FIG. 13 is a diagram showing still another exemplary display of the editing window of the moving image editing apparatus referred to in FIG. 1.
Figure 14:
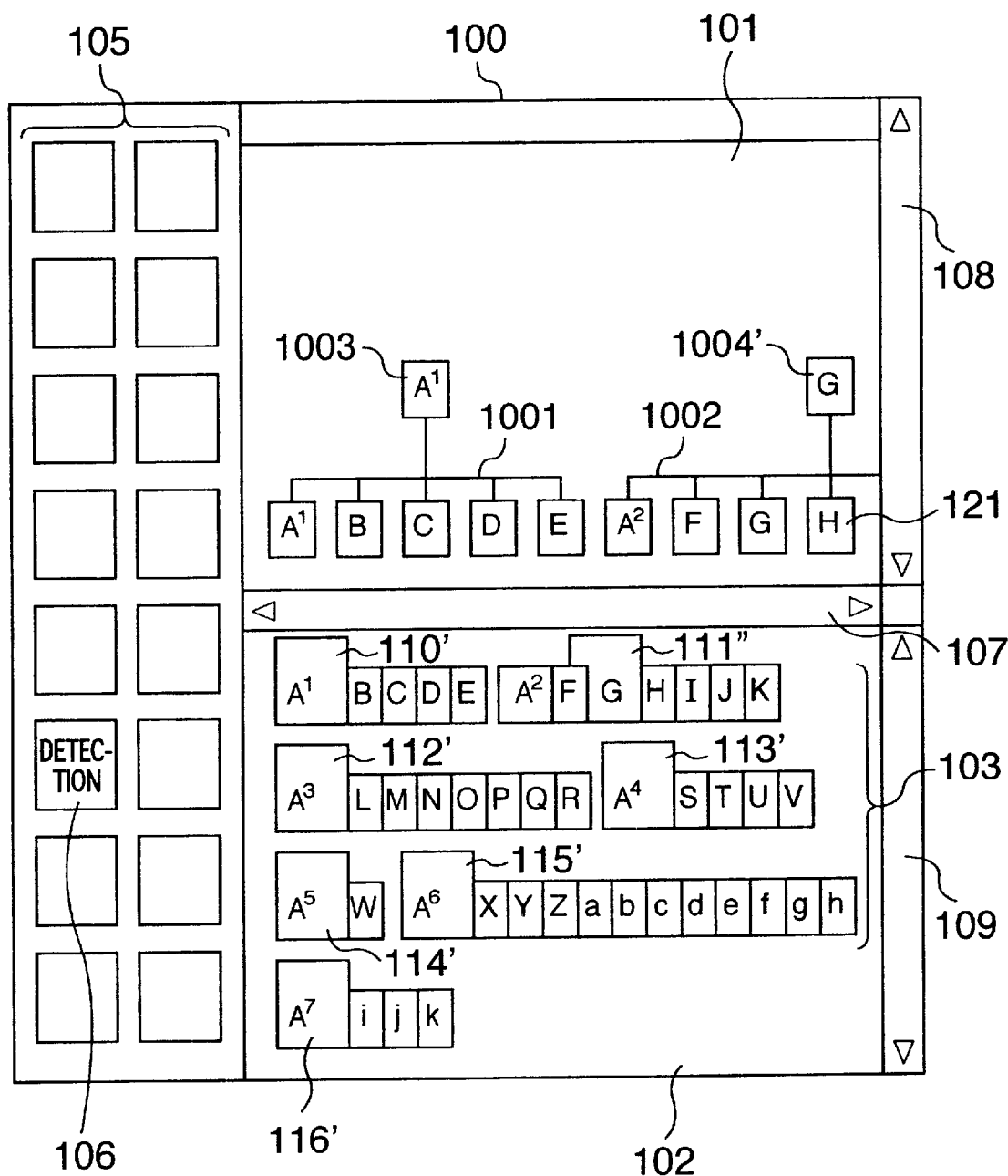
FIG. 14 is a diagram showing still another exemplary display of the editing window of the moving image editing apparatus referred to in FIG. 1.

Still another display mode that is available is designed so that the interval between M-icons within one news item is different from that between news items. For example, as shown by the M-icons 103 in FIGS. 13 and 14, a group of M-icons "$A^1$" to "E" is arranged either at a narrow interval, contiguous with no interval, or partially overlapped, and the M-icon "E" located at the end of the news item and the M-icon "$A^2$" at the beginning of a succeeding news item are arranged at a wider interval. The M-icons 103 in FIGS. 13 and 14 are also arranged so that the M-icons "$A^1$," "$A^2$" and the like heading news items are displayed in a larger size than the other M-icons "B" to "E" and "F" to "K."

Figure 10:
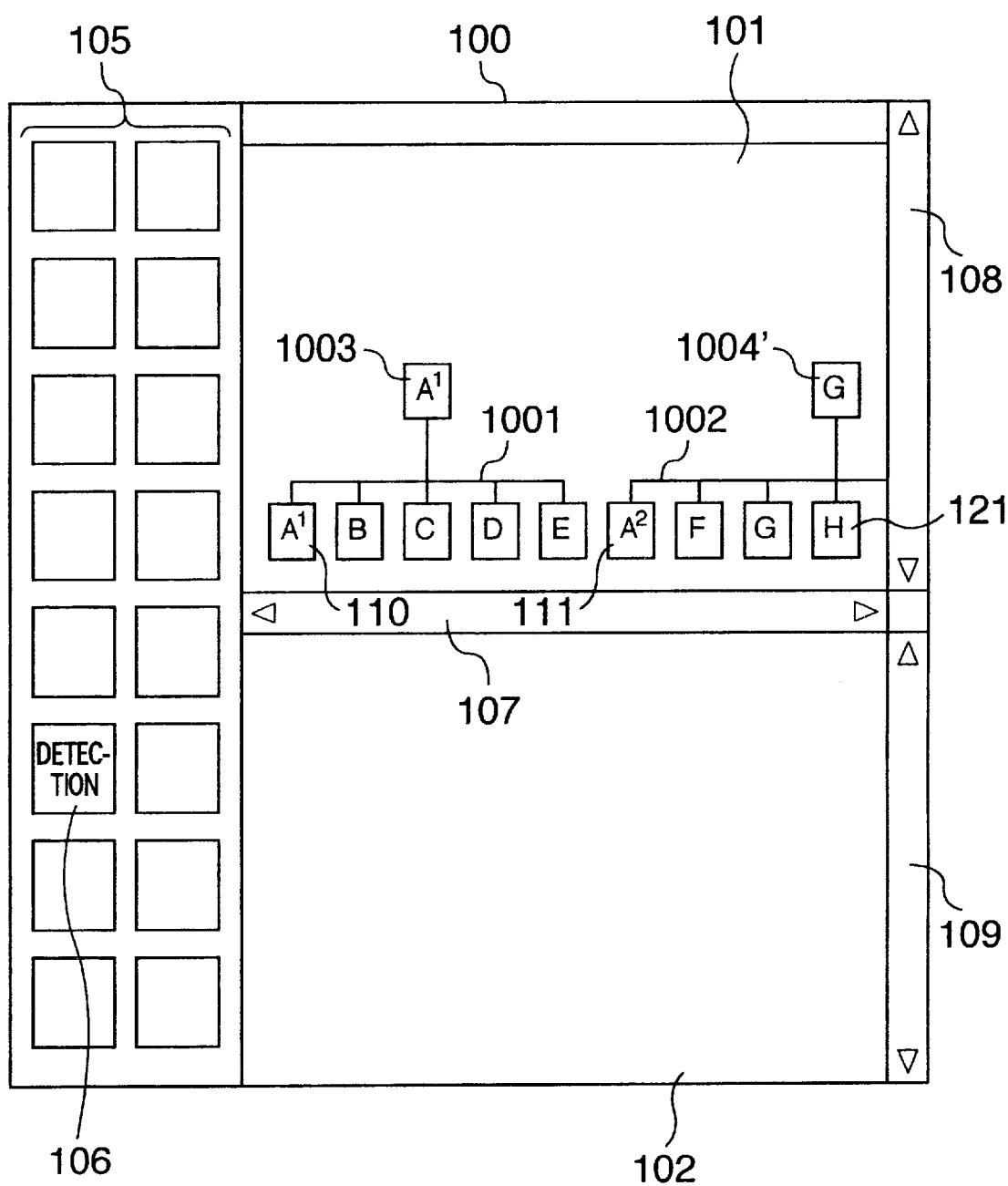
FIG. 10 is a diagram showing an exemplary display of an editing area of the moving image editing apparatus referred to in FIG. 1.

While the case where each of the foregoing detection and display modes is used singly has been described in the aforementioned embodiments, these modes can be used in combination. For example, the operator can display groups of M-icons by feeding lines to them and further surrounding them with frames. It goes without saying that detection and display modes other than those shown in FIG. 5 can be added to serve different editing purposes and to suit different types of materials. Let us describe, in some more detail, FIG. 13 that shows an exemplary display mode in the material area. M-icons 110', 111', . . . , 116' respectively denoted by "$A^1$," "$A^2$" . . . , "$A^7$" are displayed in a larger size, and the other M-icons 103 denoted by "B" . . . "E," "F" . . . "K," "L" . . . "R," "S" . . . "V," "W," "X" . . . "h," "i" . . . "k" are displayed in a smaller size. These M-icons are also displayed in a partially overlapped manner. Let us refer to FIG. 14 again to describe a change of tree structure for a group of M-icons "$A^2$" to "K." That is, the M-icon 1004, which is the cut "$A^2$" displayed on top of the tree structure in FIG. 13 is replaced with M-icon 1004' which is the cut "G" as in the example shown in FIG. 10. When the operator performs this operation, the large-sized M-icon "$A^2$" in the material area 102 instantly changes into a small-sized one 111' and the M-icon "G" instantly changes into a large-sized one 111". On the other hand, when the operator selects an M-icon he wishes to raise to the top of the tree from the small-sized M-icons 103 in the material area 102, the selected M-icon grows larger with the original large-sized M-icon reduced, and in association therewith, the corresponding M-icon on top of the corresponding tree in the editing area 101 is accordingly replaced.

Data used for feature detection is not an M-icon (80×60 pixels), but may be, e.g., an NTSC image (640×480 pixels) or other reduced image.

A case where person-based detection data other than an M-icon (80×60 pixels) is used will be described. Data consisting of 160×120 pixels is taken as an example.

First, moving image data (640×480 pixels) stored in the magnetic storage unit 306 is read to the memory 302. To prepare 160×120 pixel data, the read data is subjected to a ¼ thinning process in both horizontal and vertical directions (a thinning of ¹⁄₁₆ in terms of area).

The thus processed data is then subjected to a person-based detection process. It may be noted that the thus prepared detection data is managed on a frame basis in a manner similar to the moving image data and M-icons stored in the magnetic storage unit 306. Therefore, the detection data corresponds to M-icons on a one-to-one basis, and thus the person-based detected result can be represented using M-icons (in the line feed display mode and tree structure display mode).

The operations involved in the method and the apparatus used for moving image editing may be coded so that a computer can read, and the coded data may be stored in a recording medium. The recording medium for storing data about the operations of the moving image editing methods and apparatus may be various media including magnetic disks, optical disks and semiconductor memories.

As described in the foregoing, the present invention can provide the moving image editing method and apparatus that help an operator find an image to be edited easily and quickly by displaying a detected result with a feature indication on a display screen.

The present invention can also provide the moving image editing method and apparatus that help the operator find an image to be edited easily and quickly by allowing the operator to specify an object to be detected.

What is claimed is:

1. A method of editing a moving image, comprising the steps of:

dividing a moving image into a plurality of cuts based on cut change points of the moving image, each of the cuts including a plurality of frame images and being represented by a respective representative image;

designating a plurality of the representative images respectively representing a plurality of the cuts to be edited;

detecting whether a predetermined feature appears in each of the designated representative images;

selecting groups of the designated representative images based on a result of the detecting step, each of the selected groups including a representative image having the predetermined feature; and displaying the selected groups of the designated representative images by arranging the representative images in the selected groups on a screen of a display unit such that a display format of representative images having the predetermined feature is different from a display format of representative images not having the predetermined feature to enable the representative images having the predetermined feature to be distinguished from the representative images not having the predetermined feature.

2. A method according to claim 1, wherein the representative images in the selected groups are arranged on the screen of the display unit such that each of the representative images having the predetermined feature is displayed at a beginning of a respective line in a display area of the screen of the display unit.

3. A method according to claim 1, wherein the display format of the representative images having the predetermined feature includes a symbol or a character which is displayed on the screen of the display unit near each of the representative images having the predetermined feature.

4. A method according to claim 1, wherein the representative images in the selected groups are arranged on the screen of the display unit such that the representative images in each of the selected groups are contiguous with one another or overlap one another.

5. A method of editing a moving image, comprising the steps of:

dividing a moving image into a plurality of cuts based on cut change points of the moving image, each of the cuts including a plurality of frame images and being represented by a respective representative image;

designating a plurality of the representative images respectively representing a plurality of the cuts to be edited;

detecting whether a predetermined feature appears in each of the designated representative images;

selecting groups of the designated representative images based on a result of the detecting step, each of the selected groups including a representative image having the predetermined feature; and displaying the selected groups of the designated representative images by arranging the representative images in the selected groups on a screen of a display unit such that the representative images in each of the selected groups are surrounded by a respective frame.

6. A method according to claim 5, wherein the representative images in the selected groups are arranged on the screen of the display unit such that the representative images in each of the selected groups are contiguous with one another or overlap one another.

7. A method of editing a moving image, comprising the steps of:

dividing the moving image into a plurality of cuts based on cut change points of the moving image, each of the cuts including a plurality of frame images and being represented by a respective representative image;

designating a plurality of the representative images respectively representing a plurality of the cuts to be edited;

detecting whether a predetermined feature appears in each of the designated representative images;

selecting groups of the designated representative images based on a result of the detecting step, each of the selected groups including a representative image having the predetermined feature; and displaying the selected groups of the designated representative images by arranging the representative images in the selected groups on a screen of a display unit such that a shape of representative images having the predetermined feature is different from a shape of representative images not having the predetermined feature.

8. A method according to claim 7, wherein a size of the representative images having the predetermined feature is larger than a size of the representative images not having the predetermined feature, thereby causing the shape of the representative images having the predetermined feature to be different from the shape of the representative images not having the predetermined feature.

9. A method according to claim 7, wherein the representative images in the selected groups are arranged on the screen of the display unit such that the representative images in each of the selected groups are contiguous with one another or overlap one another.

10. An apparatus for editing a moving image, comprising:

an input unit which enables an operator to input an instruction;

a storage unit which stores data of a plurality of frame images constituting a moving image and representative images representing the frame image;

a display unit displays the representative images; and a control unit which receives the instruction from the input unit, executes a predetermined editing process, and outputs edited results to the display unit, the control unit including a dividing unit which divides the moving image into a plurality of cuts based on cut change points of the moving image, each of the cuts including a plurality of frame images and being represented by a respective representative image, a designating unit which designates a plurality of the representative images respectively representing a plurality of the cuts to be edited, a detector which detects whether a predetermined feature appears in each of the designated representative images, and a selector which selects groups of the designated representative images based on a result of the detecting step, each of the selected groups including a representative image having the predetermined feature, wherein the control unit controls the display unit to display the selected groups of the designated representative images by arranging the representative images in the selected groups on a screen of the display unit such that a display format of representative images having the predetermined feature is different from a display format of representative images not having the predetermined feature to enable the representative images having the predetermined feature to be distinguished from the representative images not having the predetermined feature.

11. An apparatus according to claim 10, wherein the representative images in the selected groups are arranged on the screen of the display unit such that each of the representative images having the predetermined feature is displayed at a beginning of a respective line in a display area of the screen of the display unit.

12. An apparatus according to claim 10, wherein the display format of the representative images having the predetermined feature includes a symbol or a character which is displayed on the screen of the display unit near each of the representative images having the predetermined feature.

13. An apparatus according to claim 10, wherein the representative image of the selected group and the representative images of unselected groups are displayed so as to be continued with each other or overlap to each other.

14. An apparatus for editing a moving image, comprising:

an input unit which enables an operator to input an instruction;

a storage unit which stores data of a plurality of frame images constituting a moving image and representative images representing the frame images;

a display unit which displays the representative images; and a control unit which receives the instruction from the input unit, executes a predetermined editing process, and outputs edited results to the display unit, the control unit including a dividing unit which divides the moving image into a plurality of cuts based on cut change points of the moving image, each of the cuts including a plurality of frame images and being represented by a respective representative image, a designating unit which designates a plurality of the representative images respectively representing a plurality of the cuts to be edited, a detector which detects whether a predetermined feature appears in each of the designated representative images, and a selector which selects groups of the designated representative images based on a result of the detecting step, each of the selected groups including a representative image having the predetermined feature, wherein the control unit controls the display unit to display the selected groups of the designated representative images by arranging the representative images in the selected groups on a screen of the display unit such that the representative images in each of the selected groups are surrounded by a respective frame.

15. An apparatus according to claim 14, wherein the representative images in the selected groups are arranged on the screen of the display unit such that the representative images in each of the selected groups are contiguous with one another or overlap one another.

16. An apparatus for editing a moving image, comprising:

an input unit which enables as operator to input an instruction;

a storage unit which stores data of a plurality of frame images constituting a moving image and representative images representing the frame images;

a display unit which displays the representative images; and a control unit which receives the instruction from the input unit, executes a predetermined editing process, and outputs edited results to the display unit, the control unit including a dividing unit which divides the moving image into a plurality of cuts based on cut change points of the moving image, each of the cuts including a plurality of frame images and being represented by a respective representative image, a designating unit which designates a plurality of the representative images respectively representing a plurality of the cuts to be edited, a detector which detects whether a predetermined feture appears in each of the designated representative images, and a selector which selects groups of the designated representative images based on a result of the detecting step, each of the selected groups including a representative image having the predetermined feature, wherein the control unit controls the display unit to display the selected groups of the designated representative images by arranging the representative images in the selected groups on a screen of the display unit such that a shape of representative images having the predetermined feature is different from a shape of representative images not having the predetermined feature.

17. An apparatus according to claim 16, wherein a size of the representative images having the predetermined feature is larger than a size of the representative images not having the predetermined feature, thereby causing the shape of the representative images having the predetermined feature to be different from the shape of the representative images not having the predetermined feature.

18. An apparatus according to claim 16, wherein the representative images in the selected groups are arranged on the screen of the display unit such that the representative images on each of the selected groups are contiguous with one another or overlap one another.

19. A computer program product comprising a computer-usable medium having embodied therein computer readable program code means for editing a moving image, the computer-readable program code means including:

means for dividing a moving image into a plurality of cuts based on cut change points of the moving image, each of the cuts including a plurality of frame images and being represented by a respective representative image;

means for designating a plurality of the representative images respectively representing a plurality of the cuts to be edited;

means for detecting whether a predetermined feature appears in each of the designated representative images;

means for selecting groups of the designated representative images based on a result of the detecting step, each of the selected groups including a representative image having the predetermined feature; and means for displaying the selected groups of the designated representative images by arranging the representative images in the selected groups on a screen of a display unit such that a display format of representative images having the predetermined feature is different from a display format of representative images not having the predetermined feature to enable the representative images having the predetermined feature to be distinguished from the representative images not having the predetermined feature.

20. A computer program product according to claim 19, wherein the representative images in the select groups are arranged on the screen of the display unit such that each of the representative images having the predetermined feature is displayed at a beginning of a respective line in a display area of the screen of the display unit.

21. A computer program product according to claim 19, wherein the representative images in the selected groups are displayed on the screen of the display unit such that a shape of the representative images having the predetermined feature is different from a shape of the representative images not having the predetermined feature.

* * * * *